(12) United States Patent
Osawa et al.

(10) Patent No.: US 12,363,450 B2
(45) Date of Patent: Jul. 15, 2025

(54) IMAGING APPARATUS AND CONTROL METHOD FOR IMAGING APPARATUS

(71) Applicant: CANON KABUSHIKI KAISHA, Tokyo (JP)

(72) Inventors: Shinnosuke Osawa, Kanagawa (JP); Hideki Kadoi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 18/351,944

(22) Filed: Jul. 13, 2023

(65) Prior Publication Data
US 2024/0022829 A1    Jan. 18, 2024

(30) Foreign Application Priority Data
Jul. 15, 2022 (JP) ................. 2022-114257

(51) Int. Cl.
| H04N 23/76 | (2023.01) |
| G06T 5/40 | (2006.01) |
| H04N 23/62 | (2023.01) |
| H04N 23/71 | (2023.01) |
| H04N 23/73 | (2023.01) |

(52) U.S. Cl.
CPC .............. *H04N 23/76* (2023.01); *G06T 5/40* (2013.01); *H04N 23/71* (2023.01); *H04N 23/73* (2023.01); *H04N 23/62* (2023.01)

(58) Field of Classification Search
CPC ........ H04N 23/76; H04N 23/71; H04N 23/73; H04N 23/62; H04N 1/4074; H04N 23/667; H04N 23/75; G06T 5/40
See application file for complete search history.

(56) References Cited

U.S. PATENT DOCUMENTS

2005/0195291 A1*  9/2005  Kubo .................. H04N 23/64
348/229.1

FOREIGN PATENT DOCUMENTS

| JP | 2002-359773 A | 12/2002 |
| JP | 2015-166767 A | 9/2015 |

* cited by examiner

*Primary Examiner* — Ahmed A Berhan
(74) *Attorney, Agent, or Firm* — Cowan, Liebowitz & Latman, P.C ..

(57) ABSTRACT

An imaging apparatus includes at least one memory and at least one processor which function as: an exposure control unit configured to perform exposure control so that a representative brightness of a high brightness region of an image becomes a target brightness set by a user; and a tone correction unit configured to perform tone correction on a captured image, which was captured after performing the exposure control, based on a brightness of a dark portion that is a region having a brightness lower than the high brightness region, wherein the tone correction unit adjusts a correction amount of the tone correction so that the representative brightness of the high brightness region, which is corrected to be higher than the target brightness by the tone correction, becomes close to the target brightness.

16 Claims, 14 Drawing Sheets

FIG. 8

| DARK PORTION AVERAGE BRIGHTNESS | OUTPUT BRIGHTNESS |
|---|---|
| 10 | 12 |
| 20 | 30 |
| 30 | 40 |
| 40 | 70 |
| 50 | 90 |
| 60 | 95 |
| 70 | 100 |
| 80 | 105 |
| 90 | 110 |
| 100 | 112 |
| 110 | 115 |
| 120 | 120 |

| TARGET BRIGHTNESS | WEAKENING AMOUNT |
|---|---|
| 200 | 70% |
| 220 | 90% |
| 250 | 100% |

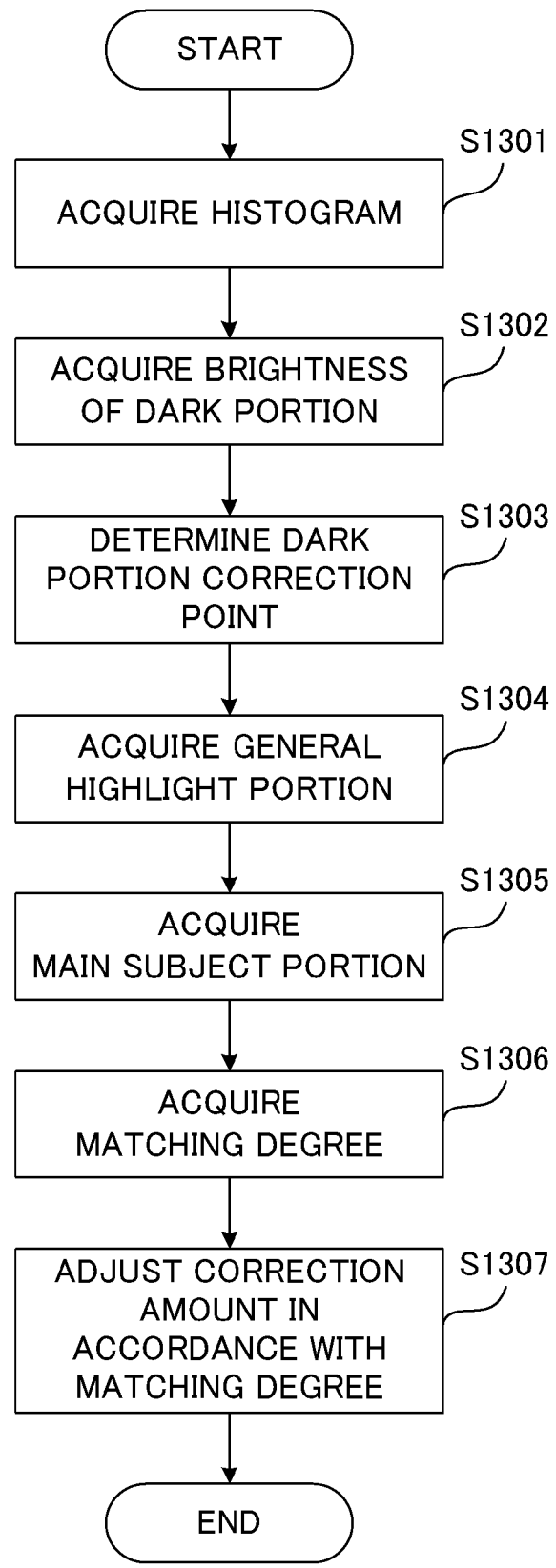

| MATCHING DEGREE | WEAKENING AMOUNT |
|---|---|
| 0 | 100% |
| 0.1 | 95% |
| 0.2 | 90% |
| 0.3 | 85% |
| 0.4 | 80% |
| 0.5 | 75% |
| 0.6 | 70% |
| 0.7 | 65% |
| 0.8 | 60% |
| 0.9 | 55% |
| 1 | 50% |

IMAGING APPARATUS AND CONTROL METHOD FOR IMAGING APPARATUS

BACKGROUND OF THE INVENTION

Field of the Invention

The present invention relates to an imaging apparatus and a control method for the imaging apparatus.

Description of the Related Art

An imaging apparatus, such as a digital camera, performs processing to automatically correct brightness of a captured image. For example, Japanese Patent Application Publication No. 2002-359773 proposes a technique to control tone based on a target brightness value and a photometric evaluation value of the image data.

As a photometry method of an imaging apparatus, a highlight-weighted photometry method, which performs photometry focusing on a high brightness region of an image, is known. In the highlight-weighted photometry method, the imaging apparatus automatically performs photometry in a high brightness region on the screen, so as to reduce overexposure. Japanese Patent Application Publication No. 2015-166767 proposes a technique that in a case where the user sets a target brightness of a highlight portion, and a region of which brightness is higher than the highlight portion exists, the influence of this region is reduced.

However, if an image is captured, at an exposure matching with the target brightness set by the user in the highlight-weighted photometry, and tone of a dark portion, which is a region of which brightness is lower than the high brightness region, is corrected, the brightness of the high brightness region changes as well. This means that the brightness of the high brightness region may deviate from the target brightness set by the user.

SUMMARY OF THE INVENTION

With the foregoing in view, it is an object of the present invention to provide a technique to correct tone in accordance with the target brightness of the highlight-weighted photometry, and still express the high brightness region at a brightness intended by the user.

An imaging apparatus according to the present invention, includes at least one memory and at least one processor which function as: an exposure control unit configured to perform exposure control so that a representative brightness of a high brightness region of an image approaches a target brightness set by a user; and a tone correction unit configured to perform tone correction on a captured image, which was captured after performing the exposure control, based on a brightness of a dark portion that is a region having a brightness lower than the high brightness region, wherein the tone correction unit adjusts a correction amount of the tone correction so that the representative brightness of the high brightness region, which is corrected to be higher than the target brightness by the tone correction, becomes close to the target brightness.

Further features of the present invention will become apparent from the following description of exemplary embodiments with reference to the attached drawings.

BRIEF DESCRIPTION OF THE DRAWINGS

FIG. 8 is an example of a correspondence table of output brightness with respect to a dark portion average brightness;

FIG. 13 is a flow chart exemplifying adjustment processing of Embodiment 3 of the tone correction;

DESCRIPTION OF THE EMBODIMENTS

Embodiments of the present invention will be described with reference to the drawings. Embodiments to be described below are examples of implementing the present invention, and may be modified or changed if necessary, depending on the configuration and various conditions of an apparatus to which the present invention is applied. Each of the embodiments may be combined if necessary.

Configuration of Digital Camera

Figure 1:
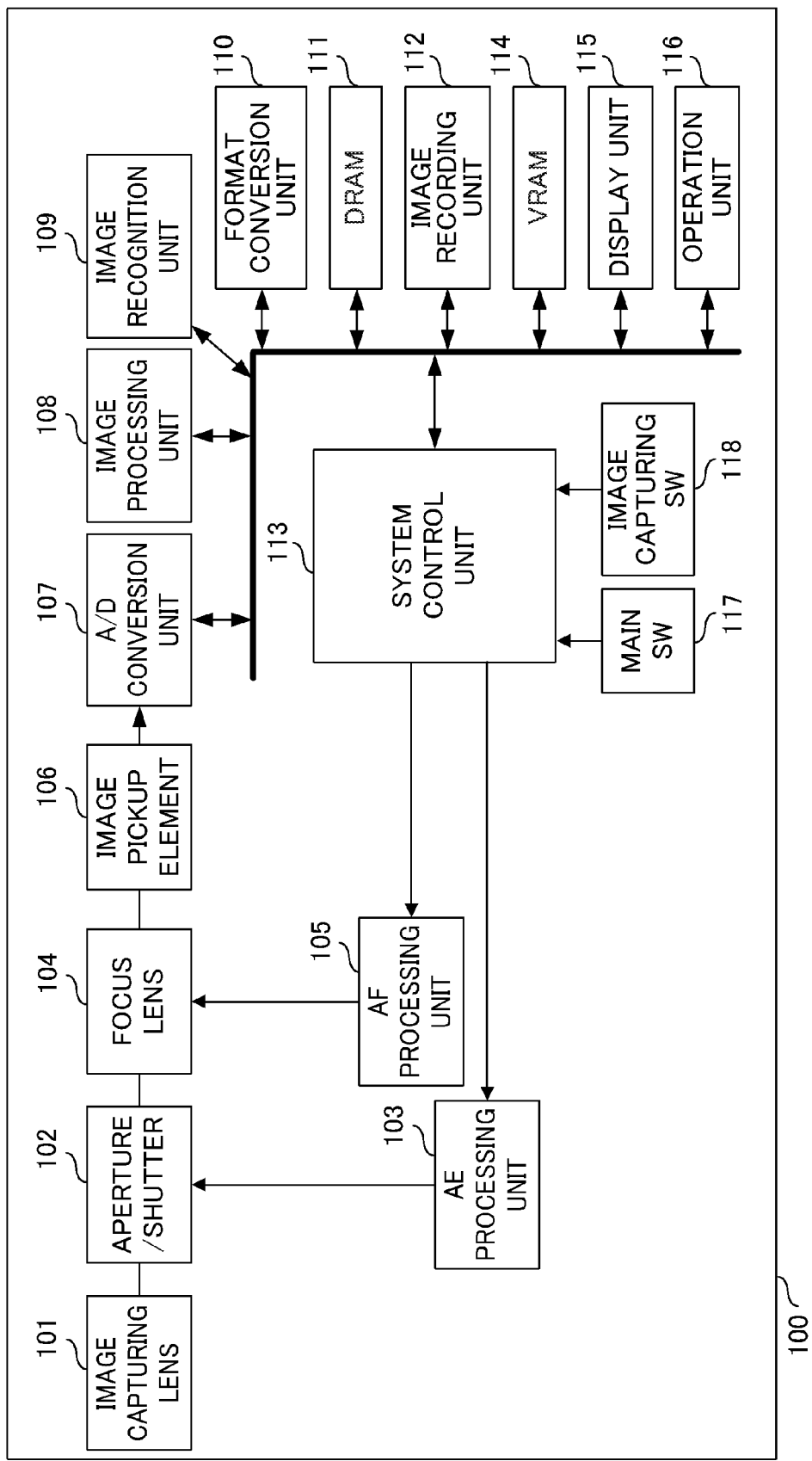
FIG. 1 is a block diagram exemplifying a configuration of a digital camera.

FIG. 1 is a block diagram exemplifying a configuration of a digital camera 100, which is an imaging apparatus according to an embodiment of the present invention. As an imaging mechanism, the digital camera 100 includes an image capturing lens 101, an aperture/shutter 102, an automatic exposure (AE) processing unit 103, a focus lens 104, an auto focus (AF) processing unit 105, an image pickup element 106 and an A/D conversion unit 107.

The image capturing lens 101 includes a zoom mechanism. The aperture/shutter 102 controls the incident light quantity of an incident light (reflected light from a subject) to the image pickup element 106, and the charge storage time, in accordance with the instruction from the AE processing unit 103. The AE processing unit 103 controls exposure by controlling the operation of the aperture/shutter 102. The AE processing unit 103 also controls the A/D conversion unit 107. The focus lens 104 forms an optical image focusing on a light-receiving surface of the image pickup element 106 in accordance with a control signal from the AF processing unit 105. The AF processing unit 105 calculates distance from the digital camera 100 to the subject.

The image pickup element 106 converts the optical image formed on the light-receiving surface into electric signals using such photoelectric conversion means as a CCD element or a CMOS element, and outputs the electric signals to the A/D conversion unit 107. The A/D conversion unit 107 converts the received electric signals (analog signals) into digital signals (RAW signals). The A/D conversion unit 107 includes a CDS circuit that removes noise from the received electric signals, and a non-linear amplification circuit to perform non-linear amplification on the received electric signals before converting the electric signals into RAW signals.

The digital camera 100 also includes an image processing unit 108, an image recognition unit 109, a format conversion unit 110, and a dynamic RAM (DRAM) 111. The image processing unit 108 performs developing processing where a predetermined pixel interpolation, resize processing (e.g. demagnifying an image), and color conversion processing are performed on the RAW signals inputted from the A/D conversion unit 107, and the image data is outputted.

The image processing unit 108 adjusts white balance (WB) for a RAW signal inputted from the A/D conversion unit 107. The image processing unit 108 also adjusts the image quality of the captured image by correcting the tone (e.g. adjusting the brightness level of the image).

For example, the image processing unit 108 has a function to increase/decrease a signal level of the image data in an entire image at a uniform amplification ratio. The image processing unit 108 also has a gamma function that converts a signal level of the RAW signal inputted from the A/D conversion unit 107 in accordance with the magnitude of the original signal level. The A/D conversion unit 107 can also convert an analog signal generated by being converted by the gamma function into a RAW signal. The image processing unit 108 can perform the tone correction in accordance with the scene based on the recognition result by the image recognition unit 109.

The image recognition unit 109 can receive input from the image data which has been processed by the image processing unit 108. The image recognition unit 109 can recognize the brightness of the inputted image using the photometric processing. The image recognition unit 109 divides an image into a plurality of regions, for example, and performs photometry for each region. By performing photometry for each of the divided regions, the image recognition unit 109 can determine a high brightness region, and acquire a photometry result for each divided region. The photometric results acquired by the image recognition unit 109 are outputted to the AE processing unit 103.

The high brightness region may be a block, in which brightness of the block is the highest in a case where an image is divided into a plurality of blocks. The brightness of a block is an average value, a maximum value, a minimum value, a median value, or a mode value, for example.

The image recognition unit 109 can recognize a scene using a known technique. The image recognition unit 109 may detect an upper half body or an entire body of a person, a creature (e.g. dog, cat, bird), a vehicle (e.g. car, motorcycle) or the like, and recognize the scene based on the detected subject(s). For example, in a case where a face of a person (subject) is detected, the image recognition unit 109 can recognize that this is a scene of capturing an image of a person. Further, in the case where a plurality of cars running side-by-side are detected, the image recognition unit 109 can recognize that this is a motor sport scene. The information on the scene identified by the image recognition unit 109 is outputted to the AE processing unit 103.

The user can select a photometry mode using the operation unit 116. The operation unit 116 outputs the photometry mode selected by the user to the AE processing unit 103. The AE processing unit 103 performs automatic exposure based on the photometry result recognized by the image recognition unit 109, the information on the scene identified by the image recognition unit 109, and the photometry mode selected by the user.

Further, the image recognition unit 109 can recognize the focusing state of an inputted image. The AF processing unit 105 implements the AF control based on the result of the focusing state recognized by the image recognition unit 109. The image recognition unit 109 can also generate a brightness histogram of an inputted image. The image processing unit 108 performs the tone correction in accordance with the scene, based on the generated brightness histogram.

The format conversion unit 110 converts the format of the image data generated by the image processing unit 108 in order to store the image data to the DRAM 111. The DRAM 111 is an internal memory, and is used as a buffer to temporarily store image data, or as a work memory to perform compression/decompression processing of the image data, for example.

The digital camera 100 includes an image recording unit 112, a system control unit 113, a video RAM (VRAM) 114, a display unit 115, an operation unit 116, a main switch (main SW) 117, and an image capturing switch (image capturing SW) 118. The image recording unit 112 includes a recording medium, such as a memory card, to record captured images (still images, moving images), and an interface thereof.

The system control unit 113 includes a CPU (processor), a ROM and a RAM. The CPU controls the general operation of the digital camera 100 by developing the programs stored in the ROM in the work area of the RAM, and executing the programs. The system control unit 113 can implement the processing of each component of the digital camera 100 by executing the program stored in the ROM. The system control unit 113 controls which mode is used, out of the plurality of imaging driving modes of the image pickup element 106. The VRAM 114 is a memory for image display.

Figure 2:
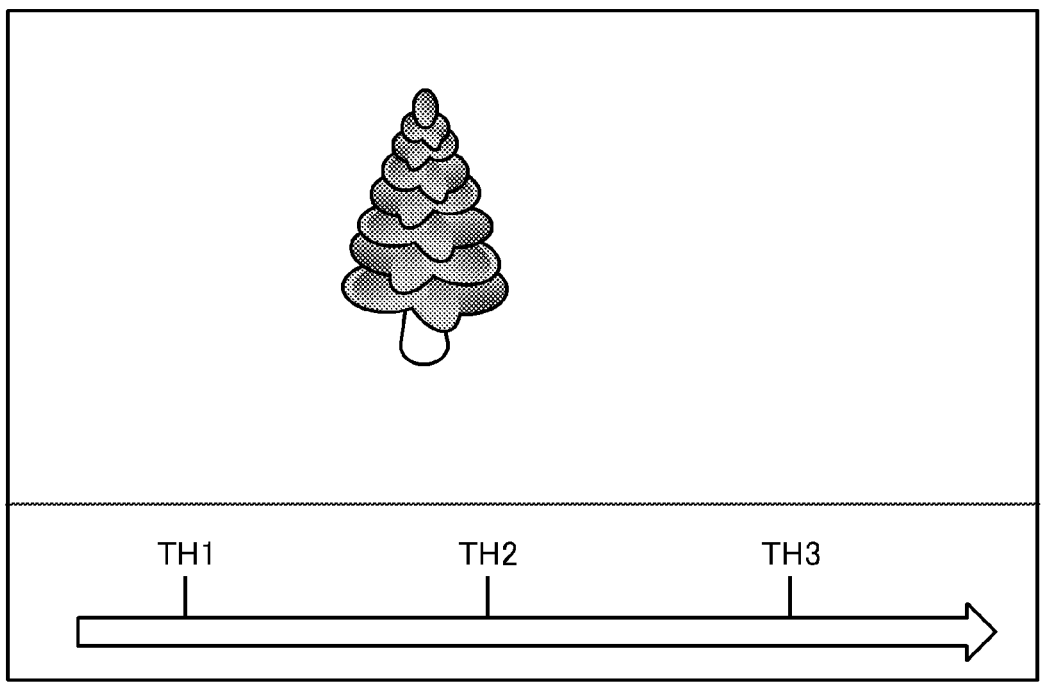
FIG. 2 is a screen example for a user to select a target brightness of a high brightness region.

The display unit 115 is a liquid crystal display (LCD), for example. The display unit 115 displays an image, displays information to assist operation, and displays the state of the digital camera 100, and when an image is captured, the display unit 115 also displays the image capturing screen and a distance measurement area. Further, as illustrated in FIG. 2, the display unit 115 displays a screen for the user to select a target brightness of the high brightness region. The target brightness is a target value or an upper limit threshold to determine a level of brightness of the high brightness region. The AE processing unit 103 controls the exposure based on the difference between the brightness of the high brightness region (e.g. average value of the brightness in the high brightness region) and the target brightness.

The operation unit 116 is a member for a user to operate the digital camera 100 externally. Using the operation unit 116, the user can perform various settings, such as settings for exposure correction, aperture value and image reproduction. The operation unit 116 includes a menu switch, a zoom lever to instruct zoom operation of the image capturing lens, an operation mode selecting switch to switch between an image capturing mode and an image reproduction mode, and the like.

The user can select a photometry mode by operating the operation unit 116. The photometry modes that the user can select are: an evaluation photometry mode, a partial photometry mode, and a highlight-weighted photometry mode, for example.

The evaluation photometry mode is a mode in which photometry is performed for each of a plurality of regions that are set on the screen, and final exposure is determined based on information on the subject, such as a brightness distribution, a color, a distance and a composition. The evaluation photometry mode is appropriate for standard image capturing, including backlight image capturing. The partial photometry mode is a mode in which photometry is performed for a center region of the screen. The partial photometry mode is effective in a case where there is strong light around the subject due to backlight or the like. The highlight-weighted photometry mode is a mode in which the exposure is determined mainly for the high brightness region on the screen to have an optimum brightness. In the highlight-weighted photometry mode, a target photometry region, where photometry is mainly performed, is the high brightness region. Generally if the exposure control is performed such that the high brightness region on the screen has an optimum brightness, exposure becomes darker in the highlight-weighted photometry mode than in the evaluation photometry mode.

The user can select a target brightness of the high brightness region by operating the operation unit 116 on the screen indicated in FIG. 2. The target brightness of the high brightness region selected by the user is outputted to the AE processing unit 103 to be used for controlling the exposure, and is outputted to the image processing unit 108 to be used for controlling the image processing.

The main switch 117 is a switch to turn the power of the digital camera 100 ON. The image capturing switch 118 is a switch to perform a two-step operation in accordance with the pushing depth of the switch. By a half depressing operation (SW1 operation), where the image capturing switch 118 is pushed in half way, the system control unit 113 executes an image capturing preparation operation, such as AE processing and AF processing. By a fully depression operation (SW2 operation), where the image capturing switch 118 is completely pushed in, the system control unit 113 executes the image capturing processing.

A series of processing executed by the digital camera 100 will be described. When power is turned ON by pressing the main switch 117, the system control unit 113 of the digital camera 100 executes the imaging processing at a predetermined cycle (e.g. 33 ms cycle) using the image pickup element 106. The digital camera 100 then enters a main image capturing standby state, where captured images are sequentially displayed on the display unit 115.

When an image capturing instruction, performed by pressing the image capturing switch 118 (SW2 operation), is received, the system control unit 113 executes the main image capturing processing using the image pickup element 106. The system control unit 113 executes the image processing on the captured image using the image processing unit 108, and records the image data after the image processing in the image recording unit 112. Then the digital camera 100 returns to the main image capturing standby state. When the main switch 117 is pressed again, power of the digital camera 100 is shut OFF.

Tone Correction Processing

Figure 3:
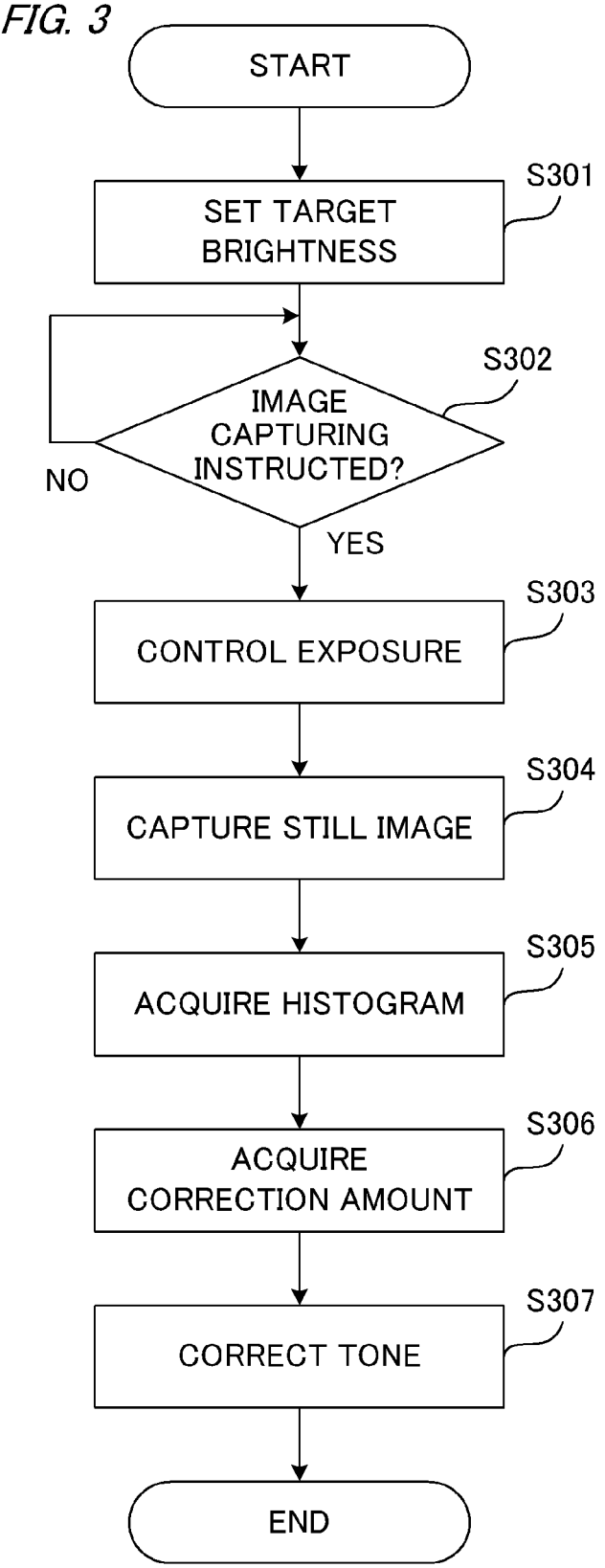
FIG. 3 is a flow chart exemplifying tone correction processing.

FIG. 3 is a flow chart exemplifying tone correction processing. The tone correction processing in FIG. 3 is processing to control exposure based on the photometry result by the highlight-weighted photometry and the target brightness, and to express the high brightness region at a brightness intended by the user. The tone correction processing indicated in FIG. 3 is started when the digital camera 100 is turned ON, and enters the main image capturing standby state, for example.

In step S301, the system control unit 113 sets a target brightness based on the specification by the user. For example, the user can specify the target brightness of the high brightness region by selecting a value from the choices of TH1, TH2 and TH3, using such an interface indicated in FIG. 2.

TH1, TH2 and TH3 may be brightness values which are set in advance, or may be changeable by the user. The user interface to set the target brightness is not limited to the example in FIG. 2. The target brightness may be set to a brightness value inputted by the user.

In step S301, it is assumed that the target brightness is set to 200 in the tone value of the JPEG image. By specifying the target brightness, the user can adjust the brightness of the high brightness region in the captured image to an intended brightness. The brightness of the high brightness region (also called "representative brightness" herein below) is an average value, a maximum value, a minimum value, a median value or a mode value of the brightness in the high brightness region.

In step S302, the system control unit 113 determines whether an image capturing instruction is performed by the image capturing switch 118. If the image capturing instruction is not received, the system control unit 113 repeats the processing in step S302 at a predetermined time interval, until the image capturing instruction is received. If the image capturing instruction is received, processing advances to step S303.

In step S303, the system control unit 113 performs the exposure control. Here an example of the exposure control based on the highlight-weighted photometry method will be described. First, using the image recognition unit 109, the system control unit 113 divides an image (a "through image") acquired in cyclic image processing in the main image capturing standby state into a plurality of blocks, and acquires an average brightness for each block.

Figure 4:
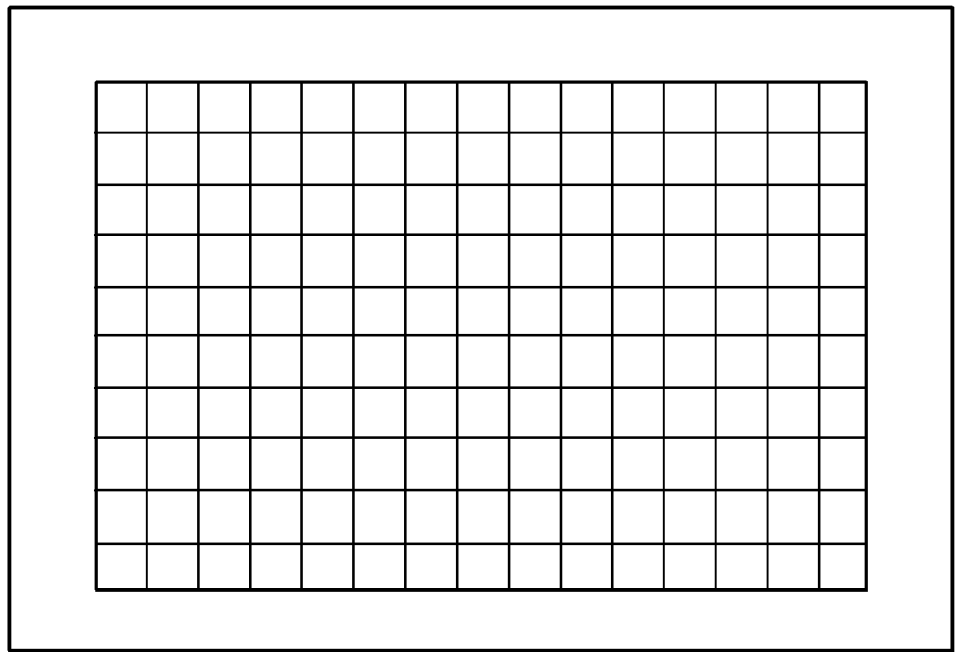
FIG. 4 is a diagram indicating an example of block division of an image.

FIG. 4 is an example of a block division of an image. As indicated in FIG. 4, the system control unit 113 may divide an image into a plurality of blocks, excluding a peripheral region of the image. The size and the number of the blocks after the division are not limited to the example in FIG. 4, and may be changed depending on the scene recognized by the image recognition unit 109, for example.

As a high brightness region, the system control unit 113 selects a block of which brightness is highest among the divided blocks. The brightness of a block is an average value, a maximum value, a minimum value, a median value or a mode value of the brightness in the block, for example. The system control unit 113 may select a plurality of blocks, including a block of which difference of the brightness from the brightness of the block having the highest brightness is not more than the threshold, as the high brightness region. The high brightness region is also called a "highlight portion".

Here a case where the target brightness is set to 200 and the brightness of the highlight portion is 240 will be described. The system control unit 113 converts the target brightness and the brightness of the highlight portion into the signal values after the A/D conversion processing before the gamma processing, based on the set values of the gamma function. The system control unit 113 acquires a difference of the number of steps of the exposure in the additive system of the photographic exposure (APEX) value between the target brightness and the highlight portion. If the linear signal values before the gamma processing of the target brightness and the brightness of the highlight portion are Ya and Yb respectively, the difference of the number of steps of exposure in the APEX value can be acquired by Log (Ya/Yb).

If the signal value Ya when the target brightness is 200 is Ya=5000, and the signal value Yb when the brightness of the highlight portion is 240 is Yb=10000, then Log(Ya/Yb)=−1. Since the target brightness is lower than the brightness of the highlight portion, the system control unit 113 sets the aperture/shutter 102 to a value that is one step higher than the current set value, and captures an image in that state, whereby the brightness of the highlight portion can be closer to the target brightness. In this way, the system control unit 113 can control the exposure based on the difference of the exposure steps between the target brightness and the brightness of the highlight portion, so that the brightness of the highlight portion roughly matches with the target brightness which the user specified in step S301.

In step S304, the system control unit 113 performs the exposure control, which is determined by the AE processing unit 103 in step S303, and captures a still image. In step S305, the image recognition unit 109 acquires a histogram (brightness histogram) of a still image captured in step S304 (image captured after the exposure control in step S304 is performed).

In step S306, the image processing unit 108 acquires a correction amount of the tone correction based on the histogram acquired in step S305. In the highlight-weighted photometry, the exposure is controlled such that the brightness of the highlight portion (high brightness region) approaches the target brightness. In this case, the dark portion, which is a region having a brightness lower than the highlight portion, becomes dark and tends to become underexposure. Therefore to make the dark portion brighter, the image processing unit 108 determines the correction amount of the tone correction based on the brightness of the dark portion.

In some cases where the tone correction is performed based on the brightness of the dark portion, the brightness of the highlight portion may be corrected to be higher than the target brightness. In the case where the brightness of the highlight portion is corrected to be higher than the target brightness, the image processing unit 108 adjusts the correction amount of the tone correction, so that the brightness of the highlight portion becomes close to the target brightness. Then the correction amount, adjusted so that the brightness of the highlight portion becomes close to the target brightness, becomes the correction amount acquired in step S306. In step S307, the image processing unit 108 performs the tone correction using the correction amount acquired in step S306.

Figure 5:
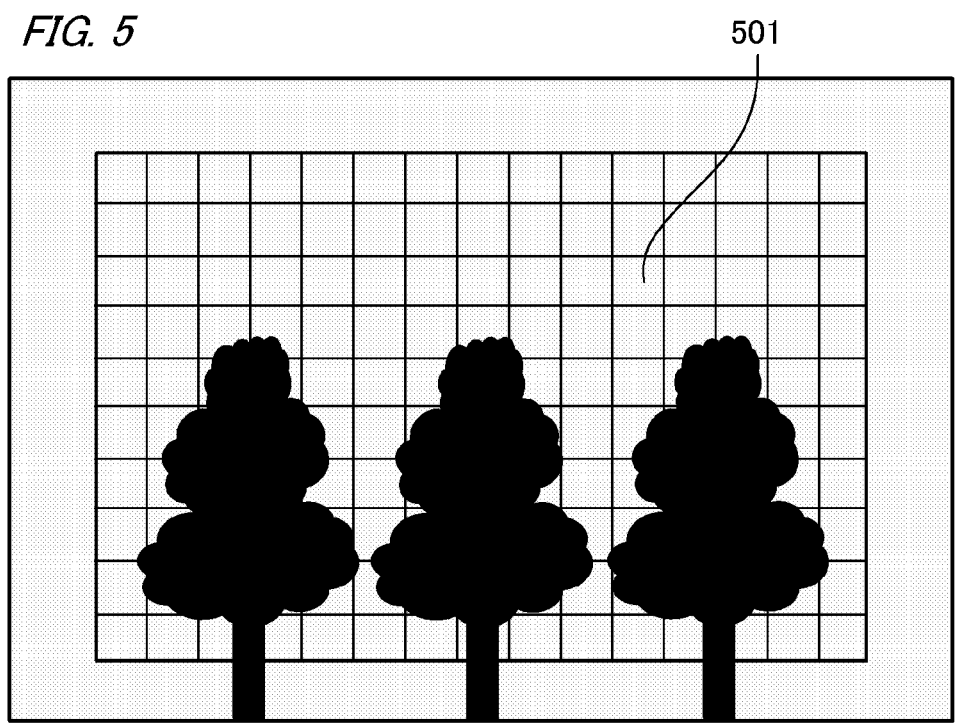
FIG. 5 is a diagram indicating an example of a scene to which Example 1 of tone correction is applied.

(Example 1 of Tone Correction) Example 1 of the tone correction, which is executed in step S305 and step S306 in FIG. 3, will be described with reference to FIG. 5 to FIG. 8. In Example 1 of the tone correction, the system control unit 113 adjusts the tone correction by reducing the general correction amount of the tone curve, so that the brightness of the highlight portion becomes close to the target brightness. FIG. 5 is an example of a scene to which Example 1 is applied, and is a scene which includes the sky and the trees in a backlight state.

In the scene in FIG. 5, the highlight portion is block 501, which is sky. Based on the specification by the user, a still image is captured at the target brightness (after gamma processing) which is 200, then the brightness of the highlight portion of the captured image becomes as intended by the user. On the other hand, the portion of trees in the front, which are in the backlight state, are captured in an underexposure state. The image processing unit 108 performs the tone correction so that the portion of the trees, which became dark due to backlight, can be captured in a brighter and more desirable state.

Figure 6:
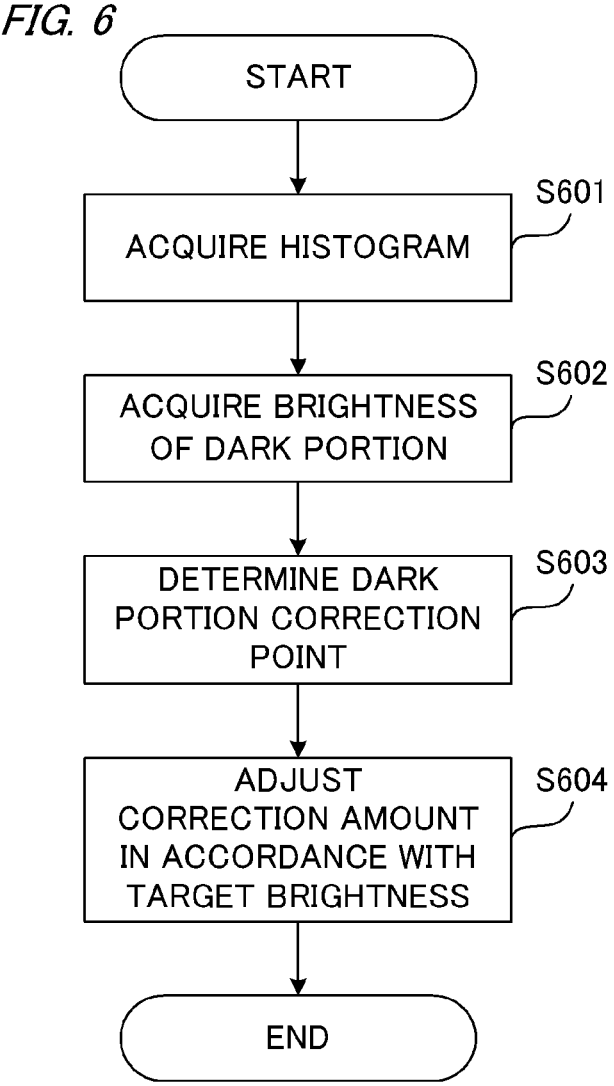
FIG. 6 is a flow chart exemplifying adjustment processing of the tone correction.

Processing to adjust the tone correction so that the dark portion becomes brighter, but the brightness of the highlight portion does not become brighter than the target brightness, will be described with reference to FIG. 6. FIG. 6 is a flow chart exemplifying the adjustment processing of the tone correction.

In the highlight-weighted photometry mode, exposure is controlled so that the highlight portion becomes the target brightness, hence the tone is compressed and the dark portion may become darker compared with the other photometry modes. Hence in the highlight-weighted photometry, the image processing unit 108 performs the tone correction so that the dark portion becomes brighter. However, if tone is corrected based on the brightness of the dark portion, the brightness of the highlight portion may be corrected to be brighter than the target brightness. Therefore in the highlight-weighted photometry mode, the image processing unit 108 adjusts the correction amount so as to weaken the intensity of the tone correction.

Figure 7:
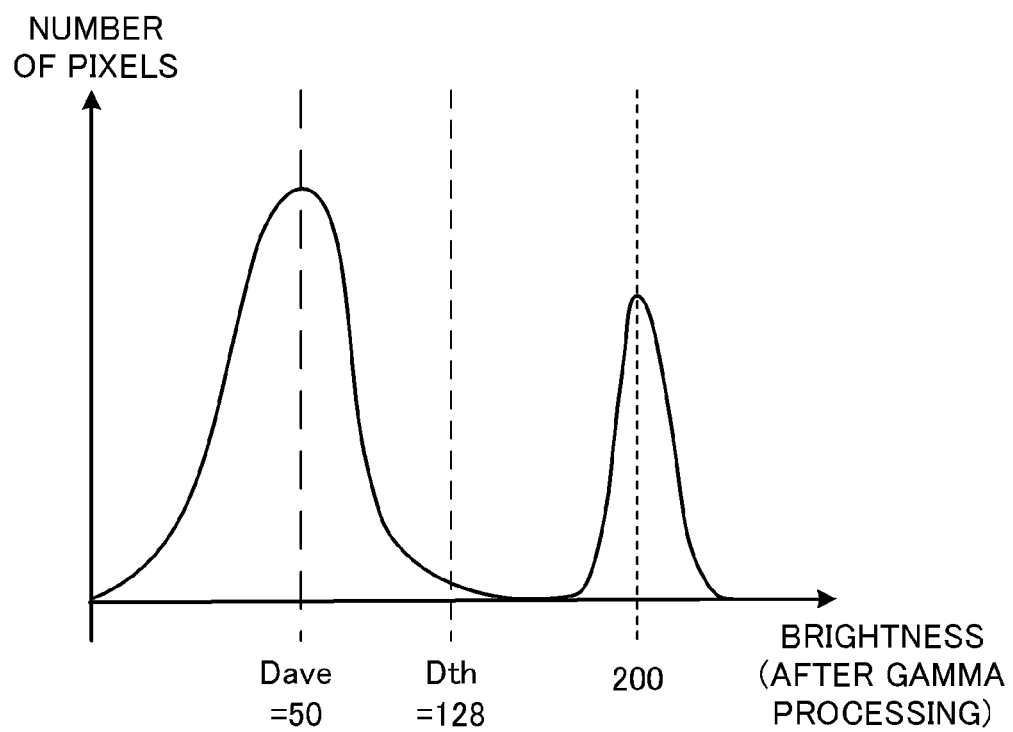
FIG. 7 is a diagram indicating an example of a histogram.

In step S601, the system control unit 113 acquires the histogram of the captured still image, as described in step S305 in FIG. 3. FIG. 7 is an example of the histogram acquired in the scene in FIG. 5. In the scene in FIG. 5, a histogram having two peaks, which correspond to the region of the sky and the region of the trees, is generated. The peak on the high brightness side corresponds to the sky, and the peak on the low brightness side corresponds to the trees. The peak corresponding to the sky, which includes the highlight portion, is formed at around the target brightness specified by the user, which is 200.

In step S602, the system control unit 113 acquires the brightness of the dark portion of the histogram acquired in step S601. The dark portion is a region of which brightness is lower than the highlight portion, and is in a brightness range of which brightness is not more than the dark portion threshold Dth=128, for example. The brightness of the dark portion is an average brightness of the dark portion, for example, and may be an average value weighted with a frequency of each bin of the histogram corresponding to the dark portion. In the scene in FIG. 5 (example in FIG. 7), the average brightness of the dark portion is Dave=50.

The dark portion threshold Dth is set to a value lower than the brightness range of the highlight portion, and may be set to a value other than 128, in accordance with the shape of the histogram. In this example, an average brightness is acquired as the brightness of the dark portion in step S602, but the system control unit 113 may regard the brightness of the apex of the peak of the histogram corresponding to the dark portion as the brightness of the dark portion. In the following description, it is assumed that the brightness of the dark portion is the average brightness of the dark portion.

In step S603, the system control unit 113 determines the dark portion correction point. The tone correction of the present embodiment is performed based on a tone curve, which expresses the correspondence of the input brightness and the output brightness of correction by a curve line or polygonal line. The dark portion correction point is one of the control points of the tone curve. The system control unit 113 can adjust the correction amount of the tone correction by increasing/decreasing the output brightness at the control points.

FIG. 8 is an example of a correspondence table (lookup table) indicating the output brightness with respect to the average brightness of the dark portion. The system control unit 113 determines a dark portion correction point by referring to the lookup table, in which the output brightness value is determined in advance by being corresponded with the average brightness value of the dark portion. In the case of FIG. 8, the output brightness corresponding to the average brightness of the dark portion Dave=50 is 90. The system control unit 113 determines a position where the input brightness is 50 and the output brightness is 90 as the dark portion correction point. A method for acquiring the output brightness corresponding to the average brightness of a dark portion is not limited to checking the predetermined lookup table, but may be a calculation formula to determine the output brightness based on the average brightness of a dark portion.

Figure 9A:
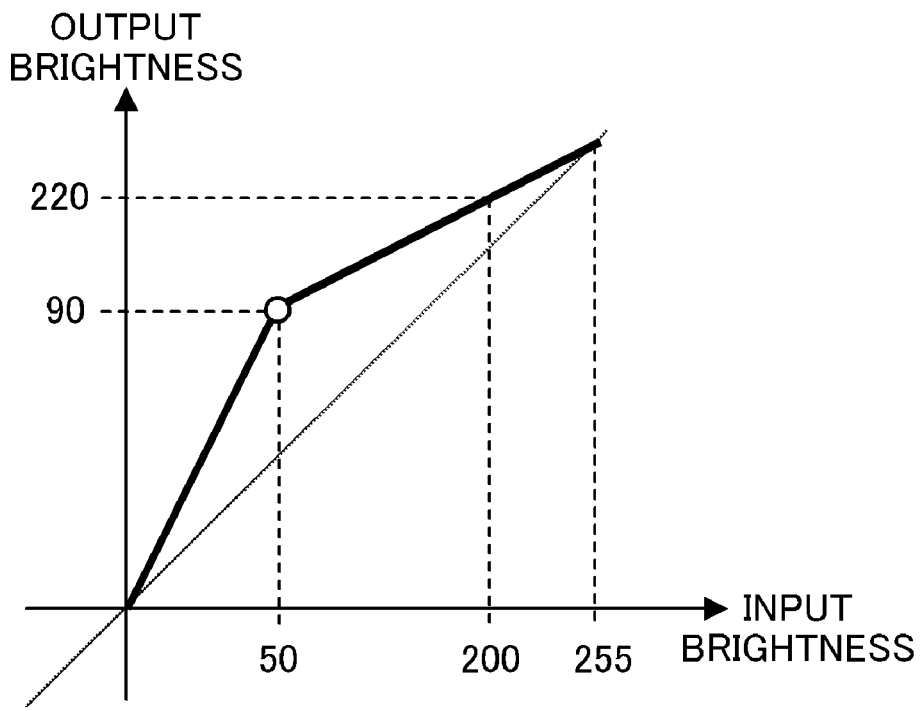
FIGS. 9A and 9B are graphs for describing Example 1 of the tone correction using a tone curve.

Example 1 of the tone correction using the tone curve will be described with reference to FIGS. 9A and 9B. FIG. 9A is an example of a tone curve generate based on the dark portion correction point which was determined in step S603. By generating the tone curve such that the output brightness, with respect to the average brightness of the dark portion Dave=50, becomes 90, and tone is corrected so that the portion of the tress, which are in the underexposure state in the scene in FIG. 5, becomes brighter.

On the other hand, by adjusting the tone curve based on the dark portion correction point, the output brightness corresponding to the target brightness 200 specified by the user increase to 220. If the tone is corrected using the tone curve in FIG. 9A, while keeping the output brightness, corresponding to the target brightness 200, as 220, the highlight portion is corrected to 220, which is higher than the target brightness 200. Hence in some cases, the image having the brightness intended by the user may not be acquired. Therefore in step S604, the correction amount of the tone correction is adjusted so that the brightness of the highlight portion becomes close to the target brightness 200.

Figures 10, 11:
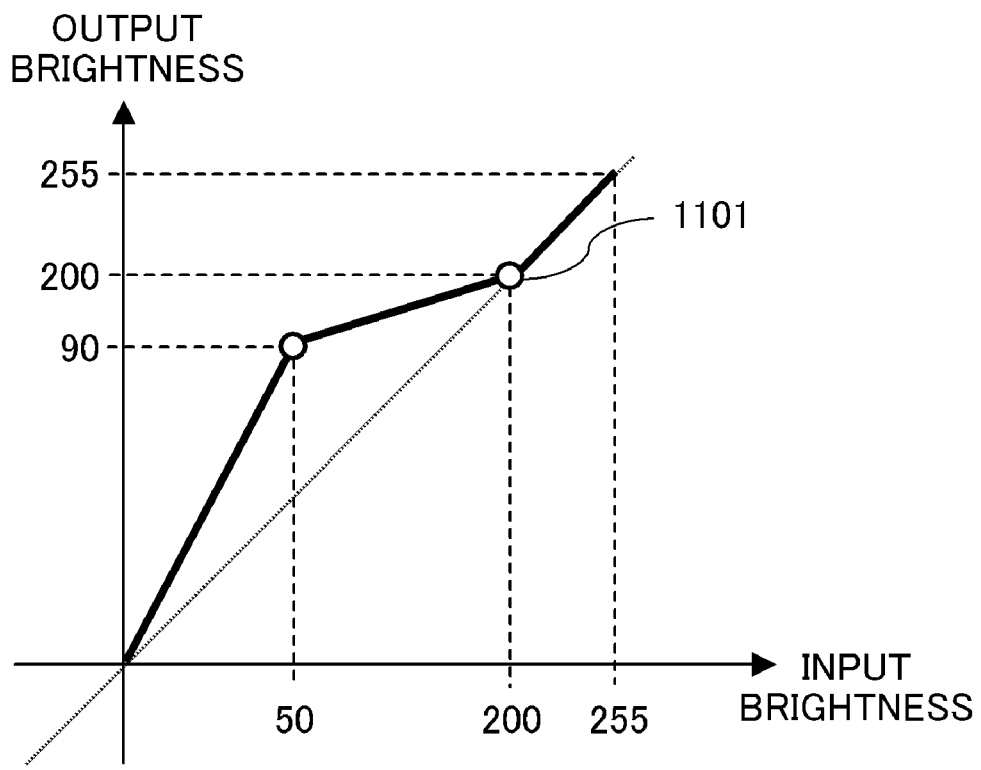
FIG. 10 is an example of a correspondence table of a weakening amount of the tone correction with respect to the target brightness.
FIG. 11 is a graph for describing Example 2 of the tone correction using a tone curve.

In step S604, the system control unit 113 adjusts the correction amount of the tone correction in accordance with the target brightness. FIG. 10 is an example of a correspondence table (lookup table) indicating a weakening amount of the tone correction with respect to the target brightness. In the case where the target brightness is TH1=200, TH2=220 and TH3=250, the weakening amount corresponding to each target brightness is 70%, 90% and 100% respectively. The system control unit 113 adjusts the output brightness of the dark portion correction point determined in step S603, using the weakening amount corresponding to the target brightness.

For example, the weakening amount corresponding to the target brightness TH1 (=200) is 70%, and the system control unit 113 multiplies the output brightness corresponding to the average brightness of the dark portion Dave=50, by the adjustment coefficient (first adjustment coefficient) 0.7, which is equivalent to the weaking amount, thereby the output brightness is adjusted to 63. By adjusting the correction amount of the tone correction, the intensity of the tone correction is weakened. A method for acquiring the weakening amount corresponding to the target brightness is not limited to checking the predetermined lookup table, but may be using a calculation formula to determine the weakening amount based on the target brightness.

Figure 9B:
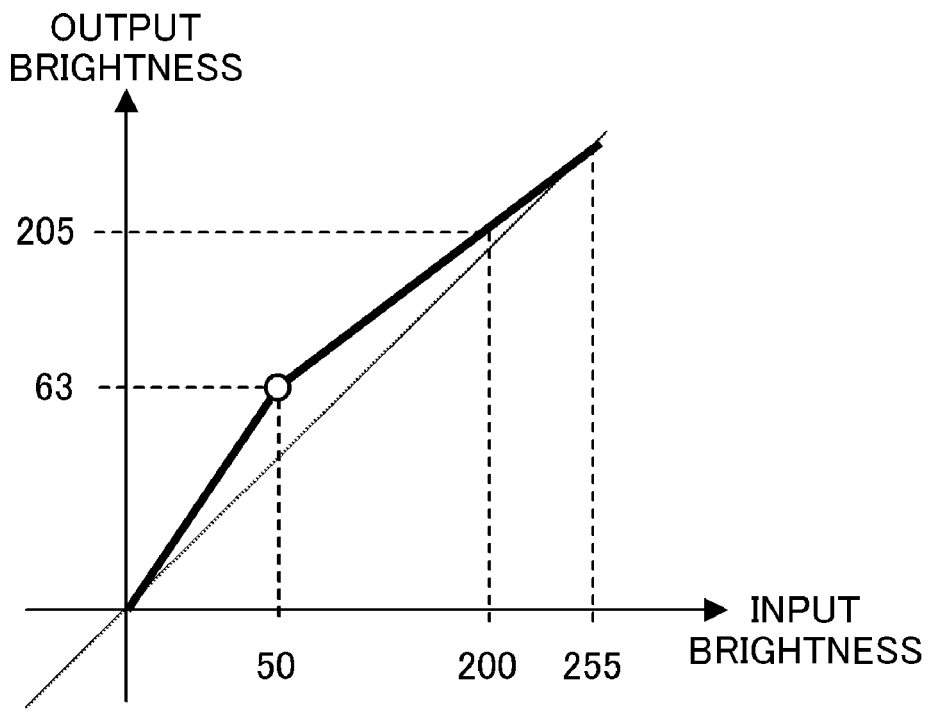

FIG. 9B is an example of a tone curve generated by weakening the intensity of the tone correction. The output brightness corresponding to the average brightness of the dark portion Dave=50 has been adjusted from 90 to 63. By weakening the intensity of the tone correction in accordance with the target brightness, the output brightness corresponding to the target brightness 200 becomes 205, which is closer to the target brightness than to the output brightness 220 in FIG. 9A. Weakening the intensity of the tone correction by reducing the general correction amount of the tone curve (adjusting each output brightness corresponding to each brightness of the captured image) makes it possible for the system control unit 113 to make the brightness of the highlight portion closer to the target brightness intended by the user.

Since the dynamic range of the image is not changed in the tone curve, the input brightness and the output brightness match at the minimum point and the maximum point of the signal value. Therefore the tone curve is generated by connecting the dark portion correction point and the minimum point of the signal value, and connecting the dark portion correction point and the maximum point of the signal value. In the case of correcting the tone in accordance with the dark portion correction point determined in step S603, the change of the output brightness of the highlight portion increases as the target brightness decreases. Therefore as indicated in FIG. 10, it is preferable that the weakening amount of the tone correction is set to be lower as the target brightness is lower.

A method for acquiring the weakening amount corresponding to the target brightness is not limited to checking the predetermined lookup table, but may be using a calculation formula that determines the weakening amount to be lower as the target brightness is lower.

(Example 2 of Tone Correction) Example 2 of the tone correction, which is executed in step S305 and step S306 in FIG. 3 will be described. In Example 1 of the tone correction, the system control unit 113 adjusts the tone correction by reducing the general correction amount of the tone curve so that the brightness of the highlight portion becomes close to the target brightness. In Example 2 of the tone correction, on the other hand, the system control unit 113 adjusts the correction amount of the tone correction so that the intensity of the tone correction becomes weaker in the high brightness region, having at least a target brightness (first brightness range) compared with a brightness region having a brightness less than the target brightness (second brightness range).

In the case of reducing the general correction amount of the tone curve, as in the case of Example 1 of the tone correction, the effect of the tone correction to brighten the dark portion is also weakened. In Example 2 of the tone correction, the system control unit 113 adjusts the correction amount so that the tone correction in the first brightness range having at least the target brightness becomes weaker than the tone correction in the second brightness range having a brightness less than the target brightness. Thereby the system control unit 113 can acquire the effect of the dark portion correction, and also implement the tone correction by which the brightness of the highlight portion becomes as intended by the user.

In Example 2 of the tone correction in step S306 in FIG. 3, the processing in step S604 in FIG. 6 is performed, which is different from Example 1 of the tone correction. The other processing is the same as Example 1 of the tone correction, hence detailed description thereof is omitted. In the following, aspects different from Embodiment 1 of the tone correction will be described.

In step S604, the system control unit 113 corrects the tone in the first brightness range having at least the target brightness by adjusting the correction amount, so that the intensity of the tone correction becomes weaker than the tone curve in FIG. 9A, which is generated based on the dark portion correction point determined in step S603.

Example 2 of the tone correction using the tone curve will be described with reference to FIG. 11. In Example 2 of the tone correction, the system control unit 113 adjusts the correction amount so that the intensity of the tone correction in the first brightness range is weakened, by placing the control point of the tone curve at a position where the input brightness is near the target brightness. In the case of FIG. 11, the control point 1101 is set at a position where the input brightness is the target brightness 200, so that the output brightness of the tone curve becomes 200, which is the same value as the input brightness.

The control point 1101 is linearly connected with the coordinates (255, 255) which is the maximum output value. In the high brightness region having at least the target brightness (first brightness range), the brightness in the first brightness range is not changed by the tone correction, hence the user can acquire an image having the intended brightness.

The control point 1101 is not limited to be set at a position where the input brightness and the output brightness match with the target brightness. It is sufficient if the control point 1101 is set such that the tone correction in the first brightness range is weaker than the tone correction in the second brightness range, and may be set at a different position based on the position of the dark portion correction point, or depending on the state of contrast in the second brightness range.

Specifically, in a case where the inclination of the line connecting the dark portion correction point and the control point 1101 is smaller than a threshold, the contrast becomes too low, hence the system control unit 113 may increase the output brightness of the control point 1101. The system control unit 113 may also decrease the output brightness of the dark portion correction point, so that the inclination of the line connecting the dark portion correction point and the control point 1101 becomes at least the threshold.

In Example 2 of the tone correction, the correction amount is adjusted so that the intensity of the tone correction becomes weaker in the first brightness range than in the second brightness range, hence the user can acquire an image in which the effect of the tone correction of the dark portion is implemented, and of which the brightness of the highlight portion is as intended by the user.

Figure 12:
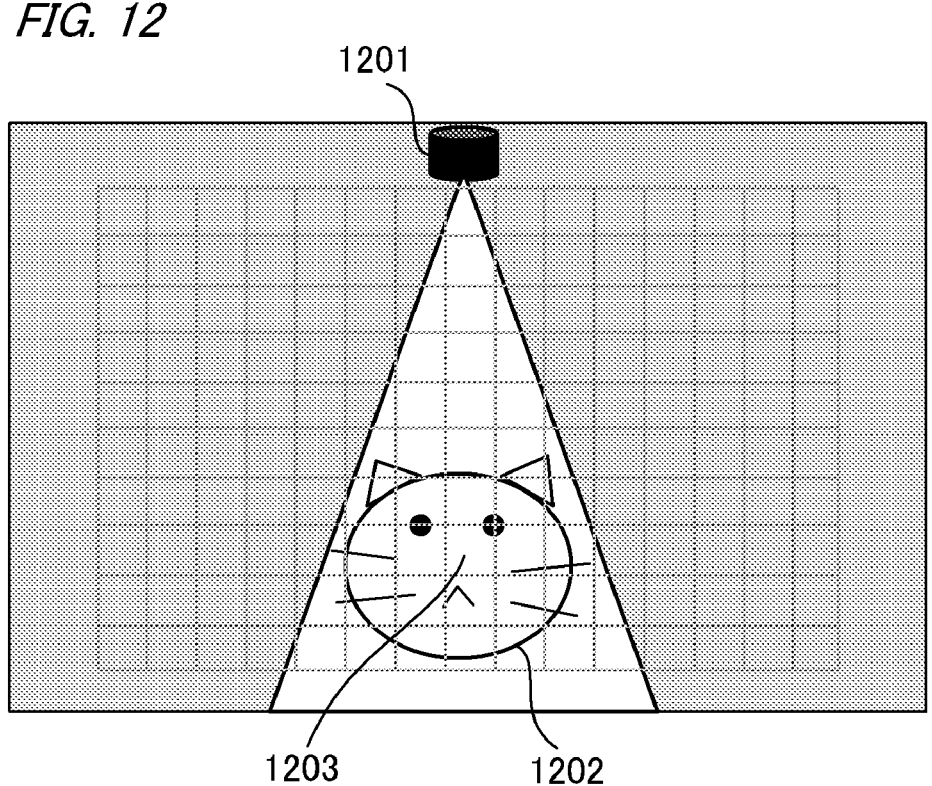
FIG. 12 is a diagram indicating an example of a scene to which Example 3 of the tone correction is applied.

(Example 3 of Tone Correction) Example 3 of the tone correction, which is executed in step S305 and step S306 in FIG. 3, will be described with reference to FIG. 12 to FIGS. 17A and 17B. In Example 3 of the tone correction, the system control unit 113 adjusts the correction amount of the tone correction based on the matching degree between a region including a highlight portion and a region including a main subject. FIG. 12 is an example of a scene to which Example 3 of the tone correction is applied, and is a scene where a spotlight source 1201 is lighting the lower portion of the image, where an animal 1202 (subject) exists, from an upper portion of the image.

In the scene indicated in FIG. 5, the trees (main subject) are in the underexposure state because of the backlight. In the scene indicated in FIG. 12, on the other hand, the animal 1202 (main subject) is bright, since it is illuminated by the light from the light source 1201.

The region including the animal 1202 (main subject) may include a highlight portion in the case of being illuminated by the light source 1201, hence the user can make the brightness of the region including the main subject closer to the target brightness by specifying the target brightness for the highlight portion. For example, it is assumed that the highlight portion of the image in FIG. 12 is a block 1203, which is located approximately at the center of the face of the animal 1202. In this case, exposure is controlled so that the brightness of the highlight portion becomes close to the target brightness, then the region of the main subject including the highlight portion can have a brightness intended by the user.

In the scene in FIG. 12, if the dark portion in a region other than the region including the main subject is brightened by the tone correction, the highlight portion is also corrected to be brighter, and the brightness of the image becomes as not intended by the user. Further, in the case of correcting the tone to brighten the dark portion, a negative effect may be generated, such as a drop in the contrast in the entire image and an amplification of image noise.

In the scene in FIG. 5, the trees (main subject) do not become a highlight portion, hence priority can be brightening the region including the trees, but in the case of the scene in FIG. 12, it is preferable to weaken the intensity of the tone correction to prevent the negative effect generated by brightening the dark portion. In other words, in the case where the main subject and the highlight portion overlap, or in the case where the difference of the brightness between the main subject and the highlight portion is not more than the threshold, it is preferable to weaken the tone correction.

FIG. 13 is a flow chart exemplifying the adjustment processing in Example 3 of the tone correction. The processing steps S1301 to S1303 are the same as the processing steps S601 to S603 in FIG. 6 respectively, hence detailed description thereof will be omitted. In step S1302, the system control unit 113 acquires 50 as the average brightness of the dark portion Dave, just like step S602 in FIG. 6. In step S1303, the system control unit 113 determines a dark portion correction point at which the output brightness is 90, just like step S603.

In step S1304, the image recognition unit 109 acquires a general highlight portion (first region). The general highlight portion is a region combining the highlight portion and the blocks of which brightness difference from the brightness of the highlight portion is not more than a threshold. For example, in the case where the brightness of the highlight portion is Ymax, and the threshold is (Ymax×0.1), the general highlight portion may be a region combining the blocks having at least the brightness of (Ymax×0.9) (including the blocks of the highlight portion).

In FIG. 5, the block 501, which is a part of the sky, is determined as the highlight portion, and the blocks of the sky in the background are regarded as the blocks of which brightness differences from the brightness of the block 501 are not more than a predetermined threshold. Therefore the general highlight portion in the scene in FIG. 5 is a region combining the blocks corresponding to the sky.

In FIG. 12, on the other hand, the blocks illuminated by the light from the spotlight source 1201 and the blocks corresponding to the animal 1202 are regarded as the blocks, of which brightness differences from the block 1203, which was determined as the highlight portion, are not more than the predetermined threshold. Therefore the general highlight portion in the scene in FIG. 12, is a region combining the blocks illuminated by the light from the spotlight source 1201 (including the blocks corresponding to the animal 1202).

In step S1305, the image recognition unit 109 acquires the main subject portion (second region). Using a known technique, the image recognition unit 109 recognizes a scene, and detects a region of a subject (e.g. person, animal, car) focused on in the recognized scene, as the main subject portion.

The system control unit 113 may also acquire a region focused on by the AF processing unit 105 as the main subject portion. The region focused on by the AF processing unit 105 is a region of the subject, which the user focused on by the AF operation. The region of the subject which the user focused on is a region enclosed by a frame displayed on the display unit 115. Since it is assumed that the user recognizes the focused subject as the main subject, the main subject portion can be regarded as the region focused on by the AF processing unit 105.

In this way, the system control unit 113 can acquire blocks including a subject detected by the scene recognition, or blocks including a subject which the user focused on as the main subject portion. The system control unit 113 may also regard the region combining the blocks including the subject detected by the scene recognition and the blocks including the subject which the user focused on as the main subject portion.

In step S1306, the image recognition unit 109 acquires a matching degree between the general highlight portion and the main subject portion. The matching degree between the general highlight portion and the main subject portion will be described with reference to FIGS. 14A to 14C and FIG. 15.

Figure 14A:
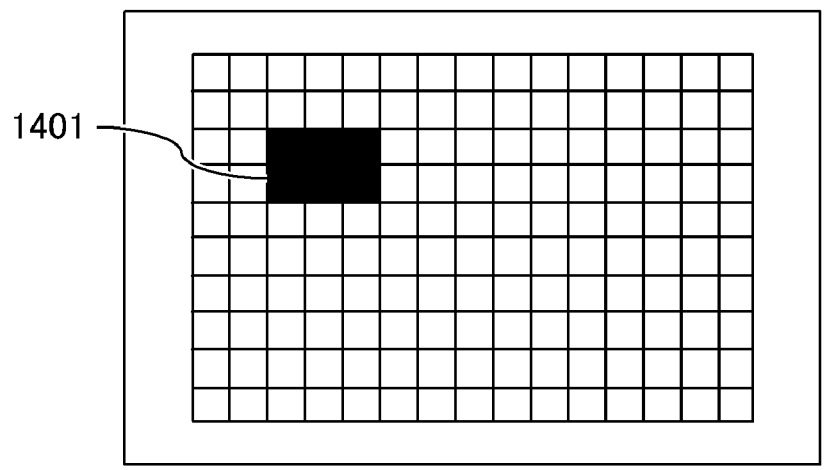
FIGS. 14A to 14C are diagrams indicating an example of a general highlight portion and a main subject portion.
Figure 14B:
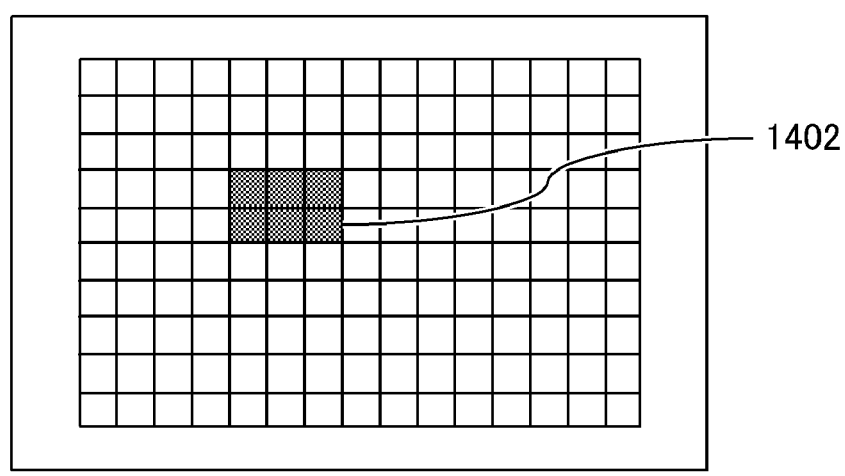
Figure 14C:
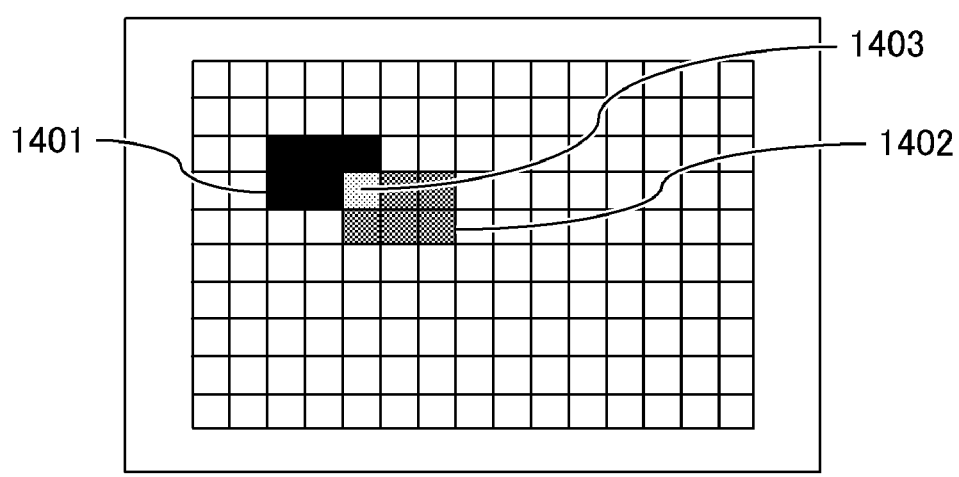

FIG. 14A indicates a general highlight portion 1401 including 6 blocks. FIG. 14B is a main subject portion 1402, including 6 blocks which are different from the general highlight portion 1401. FIG. 14C indicates a state where the general highlight portion 1401 in FIG. 14A and the main subject portion 1402 in FIG. 14B overlap at a block 1403.

The matching degree between the general highlight portion 1401 and the main subject portion 1402 can be calculated, for example, by (a number of blocks where the general highlight portion and the main subject portion overlap)÷(a number of blocks occupied by the general highlight portion and the main subject portion).

In the case of FIG. 14C, a number of blocks occupied by the general highlight portion 1401 and the main subject portion 1402 is 11. A number of blocks where the general highlight portion 1401 and the main subject portion 1402 overlap is 1 (block 1403). The matching degree between the general highlight portion 1401 and the main subject portion 1402 is 1÷11=0.1 (rounded off to second decimal).

Figures 15, 16:
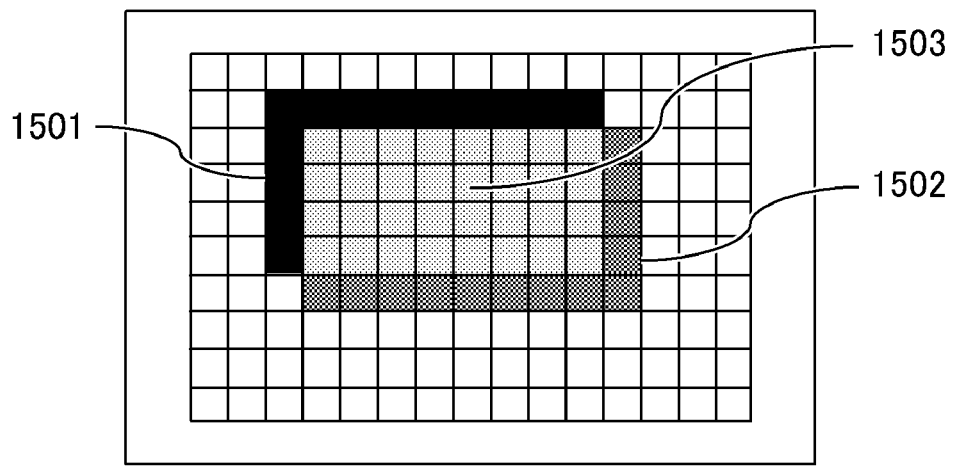
FIG. 15 is a diagram indicating another example of a general highlight portion and a main subject portion.
FIG. 16 is an example of a correspondence table of a weakening amount of the tone correction with respect to a matching degree.

FIG. 15 is another example of the general highlight portion and the main subject portion. In the case of FIG. 15, a number of blocks occupied by a general highlight portion 1501 and a main subject portion 1502 is 58. A number of blocks where the general highlight portion 1501 and the main subject portion 1502 overlap is 32. The matching degree between the general highlight portion 1501 and the main subject portion 1502 is 32÷58=0.6 (rounded off to second decimal).

Acquisition of the matching degree between the general highlight portion and the main subject portion is not limited to the acquisition based on the overlapping of the blocks (overlapping of the regions), but may be acquisition based on the matching degree of the brightness of each region. For example, the system control unit 113 calculates the average brightness of the general highlight portion 1401 in FIG. 14A based on the image, which is assumed to be Yave_a. The system control unit 113 also calculates the average brightness of the main subject portion 1402 in FIG. 14B based on the image, which is assumed to be Yave_b. The matching degree of the brightness between the general highlight portion 1401 and the main subject portion 1402 can be calculated as 1−(|Yave_b−Yave_a|÷255), for example.

Acquisition of the of the average brightness Yave_a of the general highlight portion 1401 is not limited to calculated based on the image, but a value, determined by converting the target brightness specified by the user into a signal value immediately after the A/D conversion before the gamma processing, may be used. This is because in the highlight-weighted photometry, the average brightness Yave_a of the general highlight portion becomes close to the target brightness. The target brightness can be converted into the signal before the gamma processing, using an inverse function of the function used for the gamma correction. Yave_a and Yave_b have been described as average brightness values of the general highlight portion and the main subject portion respectively, but instead of the average brightness values, the maximum value, the minimum value, the median value or the mode value of each region may be used.

In step S1307, the system control unit 113 adjusts the correction amount of the tone correction based on the matching degree acquired in step S1306. FIG. 16 is an example of a correspondence table (lookup table) indicating the weakening amount of the tone correction with respect to the matching degree. The system control unit 113 adjusts the output brightness of the dark portion correction point determined in step S1303 using the weakening amount corresponding to the matching degree between the general highlight portion and the main subject portion.

As the matching degree between the general highlight portion and the main subject portion increases, the brightness of the main subject portion before the tone correction becomes closer to the target brightness. Therefore as the matching degree between the general highlight portion and the main subject portion increases, it is preferable to that the system control unit 113 weakens the intensity of the tone correction, so that the brightness of the general highlight portion will not be corrected too bright. In other words, it is preferable that the weakening amount (ratio of the output brightness after the tone correction is weakened) is set to be lower as the matching degree between the general highlight portion and the main subject portion increases.

Figure 17A:
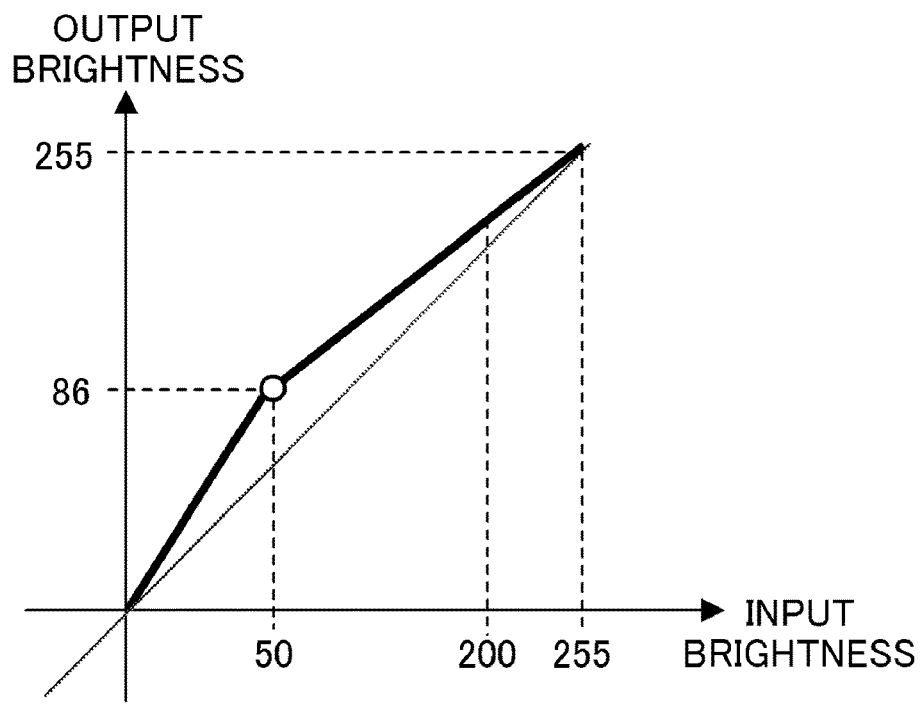
FIGS. 17A and 17B are graphs for describing Embodiment 3 of the tone correction using a tone curve.
Figure 17B:
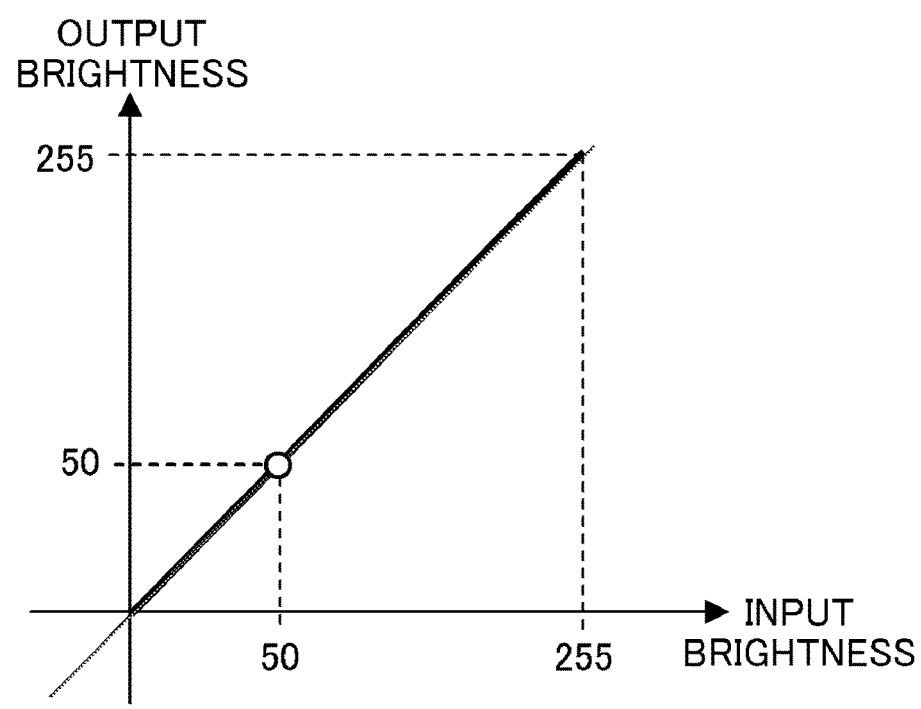

A specific example of adjusting the correction amount of the tone correction in accordance with the matching degree between the general highlight portion and the main subject portion will be described with reference to FIGS. 17A and 17B. FIG. 17A indicates an adjustment example of a tone curve in the case where the matching degree is 0.1. In the case where the matching degree is 0.1, the weakening amount is 95%. The system control unit 113 adjusts the output brightness of the dark portion correction point to 86 by multiplying the output brightness 90 corresponding to the average brightness of the dark portion Dave=50 by the adjustment coefficient (second adjustment coefficient) 0.95 corresponding to the weakening amount 95%.

In the case where the matching degree is 0.6, the weakening amount is 70%. The system control unit 113 adjusts the output brightness of the dark portion correction point to 63 by multiplying the output brightness 90 corresponding to the average brightness of the dark portion Dave=50 by the adjustment coefficient 0.7 corresponding to the weakening amount 70%.

If the output brightness after the adjustment is less than the average brightness of the dark portion Dave, then the system control unit 113 sets the average brightness Dave as the lower limit, and the output brightness of the dark portion to the same value as the average brightness Dave. For example, in the case where the matching degree is 0.9, the weakening amount is 55%. If the output brightness 90 corresponding to the average brightness of the dark portion Dave=50 is multiplied by the adjustment coefficient 0.55 corresponding to the weakening amount 55%, the output brightness becomes 49.5. Since the output brightness after the adjustment becomes less than the average brightness of the dark portion Dave, the system control unit 113 maintains the output brightness of the dark portion at 50, which is the lower limit value, without adjusting the output brightness. Therefore the output brightness becomes 50 with respect to the average brightness of the dark portion Dave=50, and the tone curve becomes as indicated in FIG. 17B, where the tone is virtually not corrected.

As the matching degree between the general highlight portion and the main subject portion is lower, it is preferable that the intensity of the tone correction is weakened less, since the main subject portion is darker than the general highlight portion. This means that the weakening amount is set to a higher value as the matching degree is lower. The system control unit 113 sets the weakening amount to be lower and weakens the intensity of the tone correction more as the matching degree between the general highlight portion and the main subject portion is higher, whereby the tone correction can be performed with reducing the negative effect of the tone correction of the dark portion.

According to the present invention, the high brightness region can be expressed at a brightness intended by the user, while performing the tone correction in accordance with the target brightness of the highlight-weighted photometry.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-114257, filed on Jul. 15, 2022, which is hereby incorporated by reference herein in its entirety.

What is claimed is:

1. An imaging apparatus comprising at least one memory and at least one processor which function as:
   an exposure control unit configured to perform exposure control so that a representative brightness of a high brightness region of an image approaches a target brightness set by a user; and
   a tone correction unit configured to perform tone correction on a captured image, which was captured after performing the exposure control, based on a brightness of a dark portion which is a region having a brightness lower than the high brightness region, wherein
   the tone correction unit adjusts a correction amount of the tone correction so that the representative brightness of the high brightness region, which is corrected to be higher than the target brightness by the tone correction, becomes close to the target brightness, by adjusting an output brightness corresponding to the brightness of the dark portion using a first adjustment coefficient, which is equivalent to a weaking amount corresponding to the target brightness, and by adjusting, based on an adjusted output brightness corresponding to the brightness of the dark portion, each output brightness corresponding to each brightness of the captured image.

2. The imaging apparatus according to claim 1, wherein the first adjustment coefficient is determined so that the output brightness corresponding to the brightness of the dark portion decreases as the target brightness is lower.

3. An imaging apparatus comprising at least one memory and at least one processor which function as:
   an exposure control unit configured to perform exposure control so that a representative brightness of a high brightness region of an image approaches a target brightness set by a user; and
   a tone correction unit configured to perform tone correction on a captured image, which was captured after performing the exposure control, based on a brightness of a dark portion which is a region having a brightness lower than the high brightness region, wherein
   the tone correction unit adjusts a correction amount of the tone correction so that an intensity of the tone correction is lower in a first brightness range in which brightness is at least a control point than in a second brightness range in which brightness is less than the control point and the representative brightness of the high brightness region, which is corrected to be higher than the target brightness by the tone correction, becomes close to the target brightness.

4. The imaging apparatus according to claim 3, wherein in the first brightness range, the tone correction unit does not perform the tone correction, and
   in the second brightness range, the tone correction unit performs the tone correction using the output brightness corresponding to the brightness of the dark portion in the tone correction.

5. The imaging apparatus according to claim 3, wherein the tone correction unit adjusts the correction amount of the tone correction based on the output brightness corresponding to the brightness of the dark portion of the tone correction, or based on a state of contrast in the second brightness range.

6. An imaging apparatus comprising at least one memory and at least one processor which function as:
   an exposure control unit configured to perform exposure control so that a representative brightness of a high brightness region of an image approaches a target brightness set by a user;
   a tone correction unit configured to perform tone correction on a captured image, which was captured after performing the exposure control, based on a brightness of a dark portion which is a region having a brightness lower than the high brightness region; and
   an acquisition unit configured to acquire a matching degree between a first region which includes the high brightness region and a second region which includes a main subject, wherein
   the tone correction unit adjusts a correction amount of the tone correction so that the representative brightness of the high brightness region, which is corrected to be higher than the target brightness by the tone correction, becomes close to the target brightness, by adjusting the output brightness corresponding to the brightness of the dark portion in the tone correction using a second adjustment coefficient in accordance with the matching degree, and adjusting each output brightness corresponding to each brightness of the captured image.

7. The imaging apparatus according to claim 6, wherein the acquisition unit acquires the matching degree based on a size of a region where the first region and the second region overlap, or based on a difference of a brightness between the first region and the second region.

8. The imaging apparatus according to claim 6, wherein the second adjustment coefficient is determined so that the output brightness corresponding to the brightness of the dark portion increases as the matching degree is lower.

9. The imaging apparatus according to claim 6, wherein the tone correction unit does not adjust the output brightness corresponding to the brightness of the dark portion in a case where the output brightness adjusted using the second adjustment coefficient is lower than the brightness of the dark portion.

10. The imaging apparatus according to claim 6, wherein the representative brightness of the high brightness region is an average value, a maximum value, a minimum value, a median value or a mode value of a brightness in the high brightness region.

11. A control method for an imaging apparatus comprising:
    an exposure control step of performing exposure control so that a representative brightness of a high brightness region of an image approaches a target brightness set by a user;
    a tone correction step of performing tone correction on a captured image, which was captured after performing the exposure control, based on a brightness of a dark portion which is a region having a brightness lower than the high brightness region; and
    an acquisition step of acquiring a matching degree between a first region which includes the high brightness region and a second region which includes a main subject, wherein
    in the tone correction step, a correction amount of the tone correction is adjusted so that the representative brightness of the high brightness region, which is corrected to be higher than the target brightness by the tone correction, becomes close to the target brightness, by adjusting the output brightness corresponding to the brightness of the dark portion in the tone correction using a second adjustment coefficient in accordance with the matching degree, and adjusting each output brightness corresponding to each brightness of the captured image.

12. A non-transitory computer readable medium that stores a program, wherein the program causes a computer to execute:
    an exposure control step of performing exposure control so that a representative brightness of a high brightness region of an image approaches a target brightness set by a user;
    a tone correction step of performing tone correction on a captured image, which was captured after performing the exposure control, based on a brightness of a dark portion which is a region having a brightness lower than the high brightness region; and
    an acquisition step of acquiring a matching degree between a first region which includes the high brightness region and a second region which includes a main subject, wherein
    in the tone correction step, a correction amount of the tone correction is adjusted so that the representative brightness of the high brightness region, which is corrected to be higher than the target brightness by the tone correction, becomes close to the target brightness, by adjusting the output brightness corresponding to the brightness of the dark portion in the tone correction using a second adjustment coefficient in accordance with the matching degree, and adjusting each output brightness corresponding to each brightness of the captured image.

13. A control method for an imaging apparatus comprising:
    an exposure control step of performing exposure control so that a representative brightness of a high brightness region of an image approaches a target brightness set by a user; and
    a tone correction step of performing tone correction on a captured image, which was captured after performing the exposure control, based on a brightness of a dark portion which is a region having a brightness lower than the high brightness region, wherein
    in the tone correction step, a correction amount of the tone correction is adjusted so that the representative brightness of the high brightness region, which is corrected to be higher than the target brightness by the tone correction, becomes close to the target brightness, by adjusting an output brightness corresponding to the brightness of the dark portion using a first adjustment coefficient, which is equivalent to a weaking amount corresponding to the target brightness, and by adjusting, based on an adjusted output brightness corresponding to the brightness of the dark portion, each output brightness corresponding to each brightness of the captured image.

14. A non-transitory computer readable medium that stores a program, wherein the program causes a computer to execute:
    an exposure control step of performing exposure control so that a representative brightness of a high brightness region of an image approaches a target brightness set by a user; and
    a tone correction step of performing tone correction on a captured image, which was captured after performing the exposure control, based on a brightness of a dark portion which is a region having a brightness lower than the high brightness region, wherein in the tone correction step, a correction amount of the tone correction is adjusted so that the representative brightness of the high brightness region, which is corrected to be higher than the target brightness by the tone correction, becomes close to the target brightness, by adjusting an output brightness corresponding to the brightness of the dark portion using a first adjustment coefficient, which is equivalent to a weaking amount corresponding to the target brightness, and by adjusting, based on an adjusted output brightness corresponding to the brightness of the dark portion, each output brightness corresponding to each brightness of the captured image.

15. A control method for an imaging apparatus comprising:

an exposure control step of performing exposure control so that a representative brightness of a high brightness region of an image approaches a target brightness set by a user; and a tone correction step of performing tone correction on a captured image, which was captured after performing the exposure control, based on a brightness of a dark portion which is a region having a brightness lower than the high brightness region, wherein in the tone correction step, a correction amount of the tone correction is adjusted so that an intensity of the tone correction is lower in a first brightness range in which brightness is at least a control point than in a second brightness range in which brightness is less than the control point and the representative brightness of the high brightness region, which is corrected to be higher than the target brightness by the tone correction, becomes close to the target brightness.

16. A non-transitory computer readable medium that stores a program, wherein the program causes a computer to execute:

an exposure control step of performing exposure control so that a representative brightness of a high brightness region of an image approaches a target brightness set by a user; and a tone correction step of performing tone correction on a captured image, which was captured after performing the exposure control, based on a brightness of a dark portion which is a region having a brightness lower than the high brightness region, wherein in the tone correction step, a correction amount of the tone correction is adjusted so that an intensity of the tone correction is lower in a first brightness range in which brightness is at least a control point than in a second brightness range in which brightness is less than the control point and the representative brightness of the high brightness region, which is corrected to be higher than the target brightness by the tone correction, becomes close to the target brightness.

* * * * *